(12) United States Patent
Chiang

(10) Patent No.: US 6,508,002 B1
(45) Date of Patent: Jan. 21, 2003

(54) BICYCLE CRANK ARM AND METHOD OF MAKING SAME

(76) Inventor: Douglas Chiang, 487, Ko-Chung Rd., Ta-Li City, Taichung Hsien (TW)

( * ) Notice: Subject to any disclaimer, the term of this patent is extended or adjusted under 35 U.S.C. 154(b) by 0 days.

(21) Appl. No.: 09/717,010

(22) Filed: Nov. 22, 2000

(51) Int. Cl.[7] .............................................. B21D 53/88
(52) U.S. Cl. ................... 29/897.2; 29/527.5; 29/527.7; 164/98
(58) Field of Search ............................. 29/897.2, 527.1, 29/527.3, 527.5, 527.7, 527.4; 164/98, 137; 280/259; 74/594.1–594.5, 579 R, 579 E, 579 F

(56) References Cited

U.S. PATENT DOCUMENTS

| | | | | |
|---|---|---|---|---|
| 3,786,543 A | * | 1/1974 | Sato | |
| 3,940,969 A | * | 3/1976 | Princehouse | |
| 4,036,044 A | * | 7/1977 | Yoshimura | |
| 4,602,524 A | * | 7/1986 | Whitten et al. | |
| 5,197,353 A | * | 3/1993 | Trenerry et al. | |
| 5,609,070 A | * | 3/1997 | Lin et al. | |
| 5,623,856 A | * | 4/1997 | Durham | |
| 5,979,923 A | | 11/1999 | Chiang | 280/259 |
| 6,038,901 A | * | 3/2000 | Stein et al. | |
| 6,058,803 A | * | 5/2000 | Yamanaka | |
| 6,145,184 A | * | 11/2000 | Yamanaka | |
| 6,178,631 B1 | * | 1/2001 | Tanabe et al. | |
| 6,195,894 B1 | * | 3/2001 | Mizobe et al. | 29/897.2 |
| 6,227,070 B1 | * | 5/2001 | Mizobe et al. | |
| 6,314,834 B1 | * | 11/2001 | Smith et al. | |

* cited by examiner

Primary Examiner—Gregory M. Vidovich
Assistant Examiner—Trinh Nguyen
(74) Attorney, Agent, or Firm—Rosenberg, Klein & Lee

(57) ABSTRACT

A method of making a bicycle crank arm bar by casting, forging, rolling, heat molding, and cold forging. The bicycle crank arm has an elongated cavity, an axle end, and a pedal end.

1 Claim, 6 Drawing Sheets

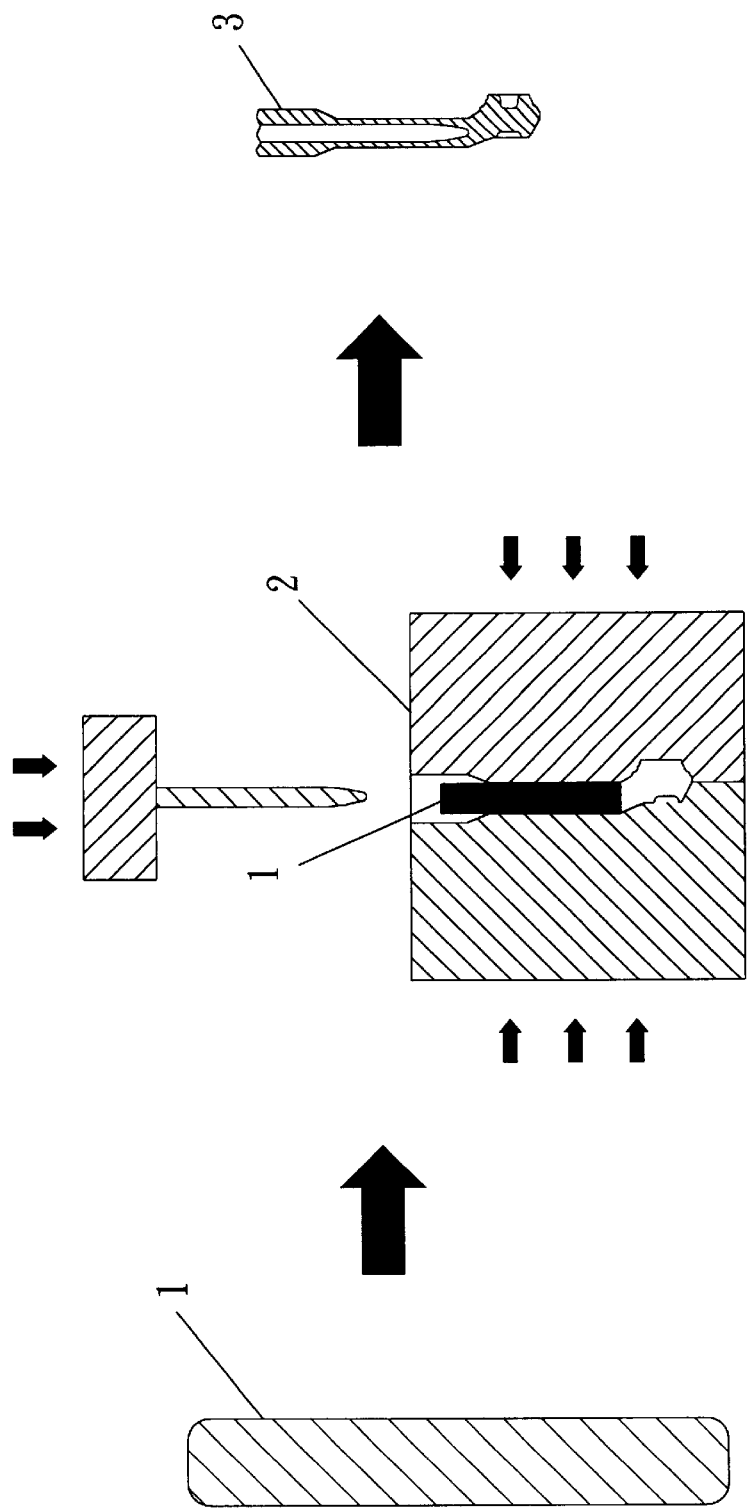

BICYCLE CRANK ARM AND METHOD OF MAKING SAME

FIELD OF THE INVENTION

The present invention relates generally to a bicycle crank arm, and more particularly to an integrally-made bicycle crank arm and a method for making integrally the bicycle crank arm.

BACKGROUND OF THE INVENTION

The U.S. Pat. No. 5,979,923 of the same applicant has disclosed a bicycle crank arm which is formed of a hollow crank body, a head portion fastened to one end of the hollow crank body, and a pedal hole portion fastened to other end of the hollow crank body. The head portion and the pedal hole portion are fastened with the hollow crank body by soldering and riveting.

Such a prior art bicycle crank arm as described above is neither cost-effective nor durable in view of the fact that the process of fastening the head portion and the pedal hole portion with the hollow crank body is rather time-consuming, and that the head portion and the pedal hole portion are apt to break away from the hollow crank body.

SUMMARY OF THE INVENTION

It is the primary objective of the present invention to provide a bicycle crank arm which is made integrally and is provided with an elongated cavity.

It is another objective of the present invention to provide a method for making integrally a bicycle crank arm.

The features and the advantages of the present invention will be more readily understood upon a thoughtful deliberation of the following detailed description of the present invention with reference to the accompanying drawings.

BRIEF DESCRIPTION OF THE DRAWINGS

FIGS. 1A–1K are schematic views of the steps of a method embodied in the present invention.

DETAILED DESCRIPTION OF THE PREFERRED EMBODIMENT

Figure 1F:
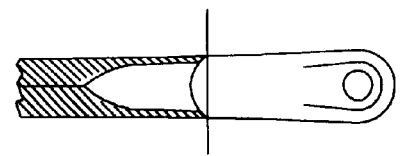
Figure 1E:
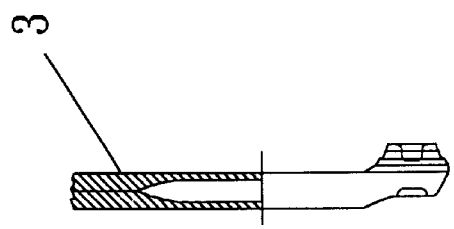
Figure 1D:
Figure 1D:
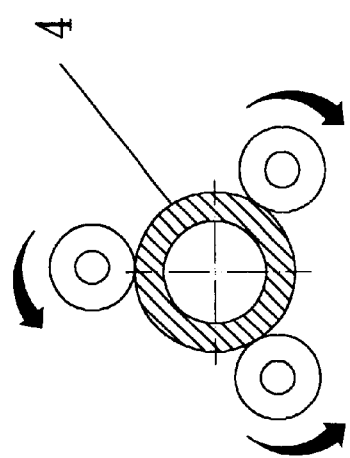
Figure 1I:
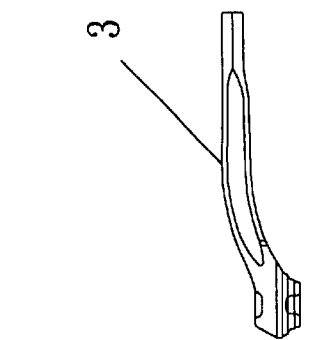
Figure 1H:
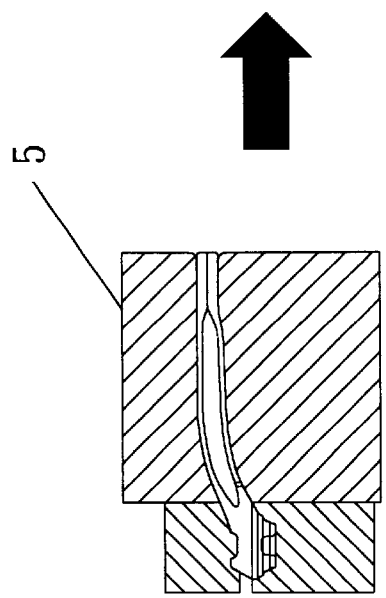
Figure 1G:
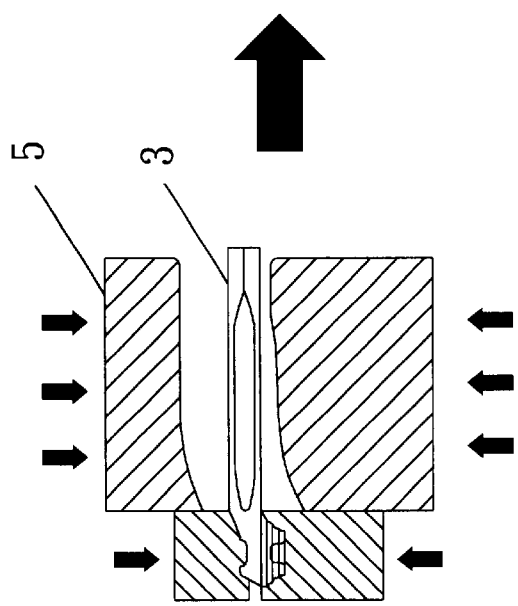
Figure 1K:
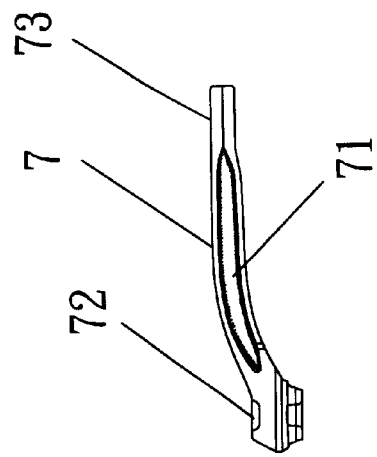
Figure 1J:
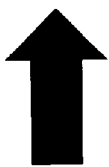
Figure 1J:
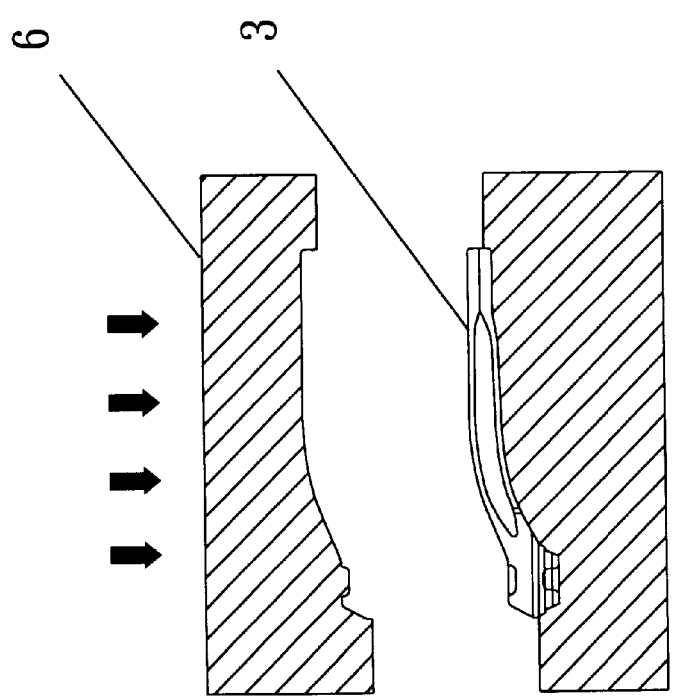

As illustrated in FIGS. 1A–1K, the method of the present invention comprises a first step in which a metal bar 1 is prepared by casting. The metal bar 1 is then shaped in a forging mold 2, which is under pressure from three directions, as shown in FIG. 1B. Upon completion of the forging process, the metal bar 1 is formed into a preliminary product 3, as shown in FIG. 1C. The preliminary product 3 has a portion which is provided with an elongated cavity. The preliminary product 3 is then processed by rollers 4 such that the portion of the preliminary product 3 is narrowed. Thereafter, the preliminary product 3 is processed in a molding tool 5 under heat and pressure such that the portion of the preliminary product 3 is curved, and that the curved portion of the preliminary product 3 has a predetermined radian, as shown in FIG. 1I. Finally, the preliminary product 3 is processed in a cold forging mold 6 so as to become a bicycle crank arm 7, as shown in FIG. 1K.

Figure 2:
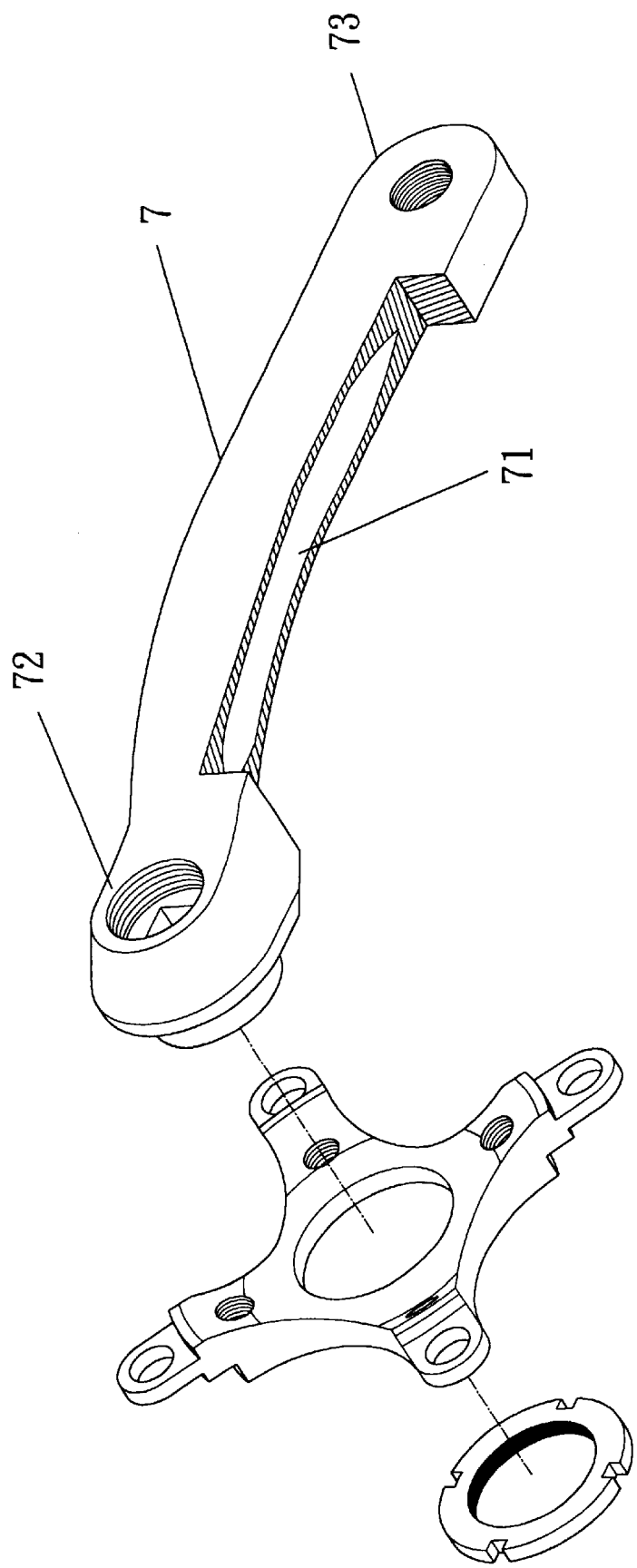
FIG. 2 shows a schematic view of the bicycle crank arm of the present invention.
Figure 3:
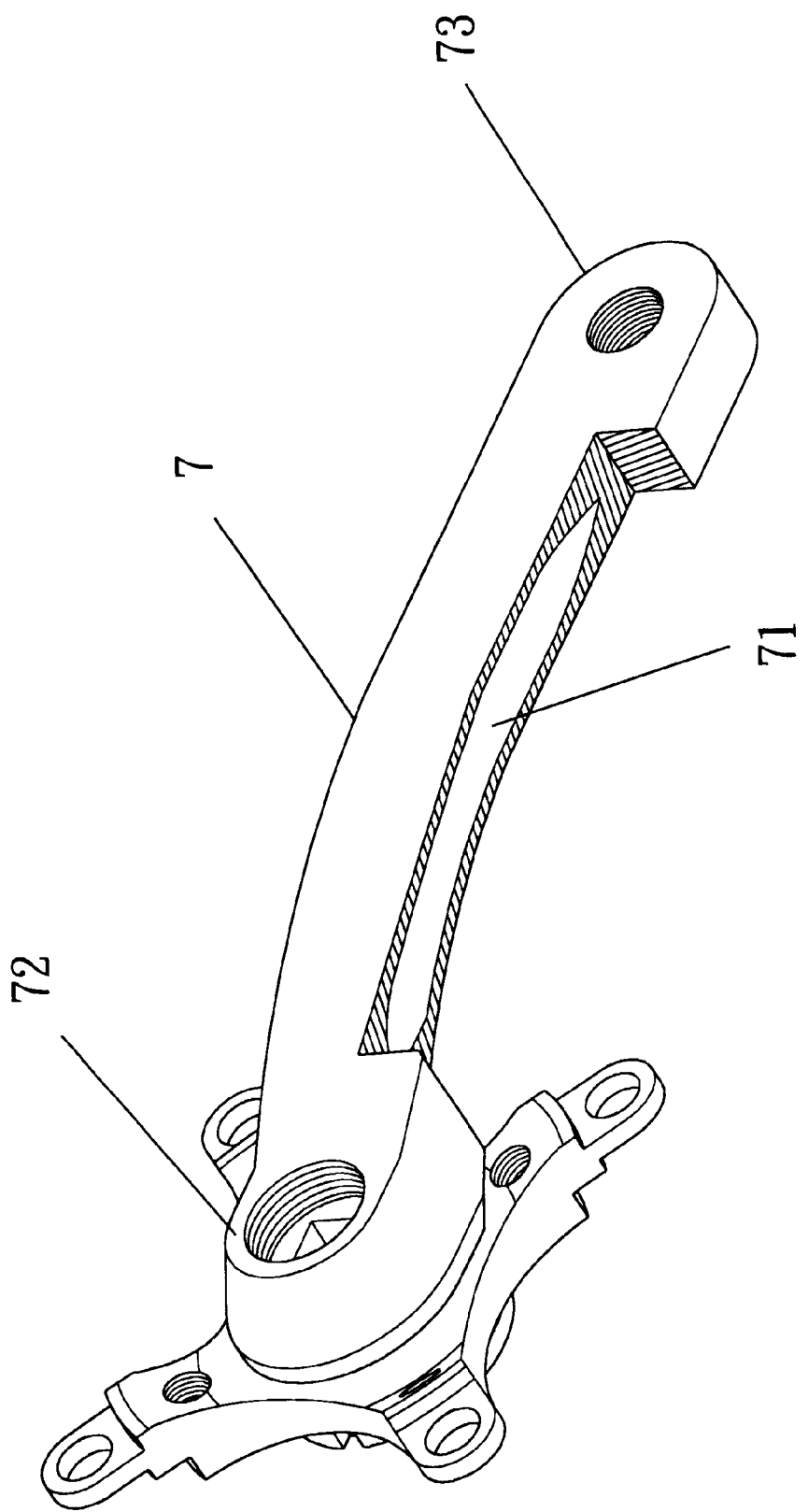
FIG. 3 shows a schematic view of the bicycle crank arm of the present invention in combination with a bicycle crank axle member.

As shown in FIGS. 2 and 3, the bicycle crank arm 7 so made has an elongated cavity 71, an axle end 72, and a pedal end 73, which are all made integrally.

What is claimed is:

1. A method for making integrally a bicycle crank arm, said method comprising the steps of:

(a) preparing a metal bar by casting;

(b) forging the metal bar such that the metal bar is formed into a preliminary product having a portion which is provided with an elongated cavity;

(c) rolling the preliminary product such that the portion of the preliminary product is narrowed;

(d) molding the rolled preliminary product under heat and pressure such that the portion of the rolled preliminary product is curved; and (e) processing the rolled preliminary product in a cold forging mold such that the rolled preliminary product is formed into a bicycle crank arm having an elongated cavity, an axle end, and a pedal end.

* * * * *